July 12, 1966  G. L. STREBLER  3,259,955
CARTRIDGE TRIMMER
Filed Sept. 11, 1964  2 Sheets-Sheet 1
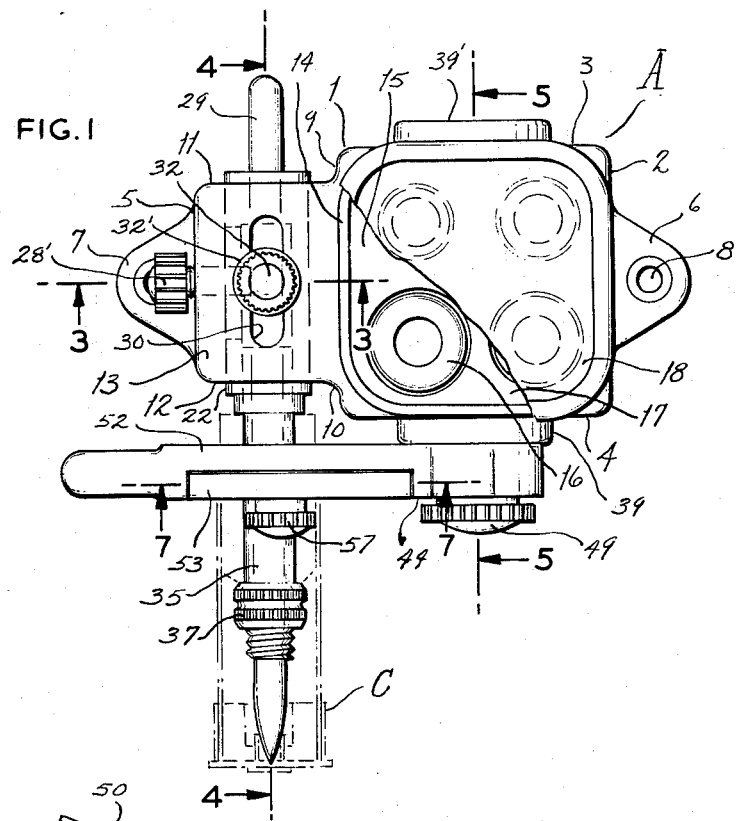
INVENTOR.
GEORGE L. STREBLER
BY Ralph W. Kalish
ATTORNEY July 12, 1966
G. L. STREBLER
3,259,955
CARTRIDGE TRIMMER
Filed Sept. 11, 1964
2 Sheets-Sheet 2
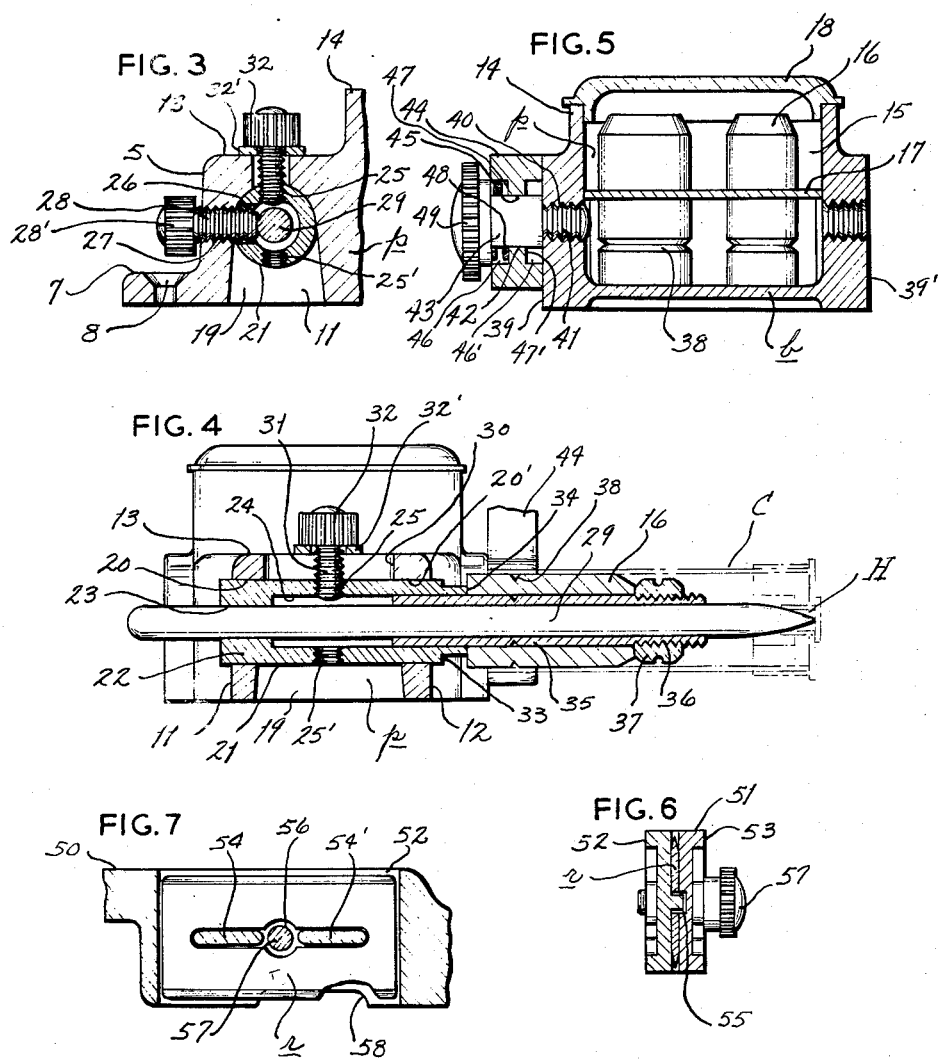
INVENTOR.
GEORGE L. STREBLER
BY Ralph W. Kalish
ATTORNEY

# United States Patent Office 3,259,955
Patented July 12, 1966

3,259,955
CARTRIDGE TRIMMER
George L. Strebler, 4015 Oregon, St. Louis, Mo.
Filed Sept. 11, 1964, Ser. No. 395,884
8 Claims. (Cl. 29—1.32)

This invention relates in general to cutting tools and more particularly to a trimmer for the reforming of cartridge shells.

It is an object of the present invention to provide a tool for trimming cartridges to render same reusable, which device may be readily utilized by marksmen without prior developed skill.

It is another object of the present invention to provide a cartridge trimmer which is uniquely adapted for efficiently accommodating cartridges of varying diameter so that the said trimmer is useful with the entire range of current cartridge shells.

It is another object of the present invention to provide a cartridge trimmer which is designed for facile operation by either a right handed or left handed individual; the components of said device being readily reversible.

It is an additional object of the present invention to provide a cartridge trimmer which integrally incorporates a depository for cartridge shell-supporting arbors of varying diameter, thereby rendering the device self-contained.

It is a still further object of the present invention to provide a cartridge trimmer which is economically produced; which is compact in construction and adapted for presentation on any convenient surface; and which is reliable and durable in usage.

Other objects and details of the invention will be apparent from the following description, when read in connection with the accompanying drawing (two sheets) wherein—

FIGURE 1 is a top view of a cartridge trimmer constructed in accordance with and embodying the present invention.

FIGURE 2 is an end elevational view of the cartridge trimmer with the cutter in elevated position.

FIGURE 3 is a vertical transverse sectional view taken on the line 3—3 of FIGURE 1.

FIGURE 4 is a vertical transverse sectional view taken on the line 4—4 of FIGURE 1.

FIGURE 5 is a vertical transverse sectional view taken on the line 5—5 of FIGURE 1.

FIGURE 6 is a vertical transverse sectional view taken on the line 6—6 of FIGURE 2.

FIGURE 7 is a vertical transverse sectional view taken on the line 7—7 of FIGURE 1.

Referring now by reference characters to the drawings which illustrate the preferred embodiment of the present invention, A designates a cartridge trimmer comprising a body 1 preferably integrally cast from any suitable material, such as metal, thermosetting resins, and the like. Body 1 incorporates a rear wall 2, parallel side walls 3, 4 and a front wall 5; there being provided bosses 6, 7 projecting perpendicularly from the lower ends of said rear wall 2 and front wall 5, respectively, each of said bosses having an opening 8 for receiving bolts (not shown) to secure trimmer A to a support surface, such as a work bench, for stabilization during usage. Side walls 3, 4 forwardly of their mid-point are turned inwardly, as at 9, 10 respectively (FIGURE 1) with their forward portions 11, 12 respectively, being relatively less spaced apart whereby front wall 5 is of less extent than rear wall 2. Extending between the upper ends of forward side wall portions 11, 12 is a top wall 13 which in its rearward portion is continuous with the forward end portion of an upstanding rim 14 cooperating with rear wall 2, and side walls 3, 4 rearwardly of points 9, 10 to define the upper end of an enlarged compartment 15 having a base wall $b$. The forward limit of said compartment 15 is constituted of a partition $p$ in planar parallel relationship to rear wall 2. Compartment 15 is adapted to provide a depository or storage for a plurality of arbors 16 of like height but varying diameter for accommodating cartridge shells, indicated at C, of different diameters for purposes presently appearing. Said compartment 15 is provided with a transverse plate 17 apertured for receiving arbors 16 to retain same in upright position. A top closure 18 is presented for removable disposition upon the upper edge of rim 14.

Front wall 5, forward side wall portions 11, 12, top wall 13 and partition $p$, define a chamber 19, forwardly of compartment 15, and which may be open at its lower end. Forward side wall portions 11, 12 are provided with aligned openings 20, 20' respectively, serving as bearings for an arbor support 21; said latter having a shaft or base portion 22, the outside diameter of which is slightly less than the inside diameter of said openings 20, 20' to allow for relative axial adjustment of support 21 therein. Shaft or base portion 22 of support 21 is of tubular form having a bore 23 and a counterbore 24; and substantially mid-way its length is provided with a pair of diametrally opposed tapped openings 25, 25', which open at their inner ends into counterbore 24. Intermediate said openings 25, 25', support 21 has formed therein a longitudinally extending, narrow, slot-like aperture 26 presented for alignment with a threaded opening 27 located centrally of front wall 5 for receiving a set screw 28 of sufficient length for extension into counterbore 24, and having an enlarged head 28'. Set screw 28 is adapted to frictionally engage at its inner end an elongated adjustment rod 29 carried within support 21. Set screw 28 thus acts to maintain rod 29 in selected relative axially shifted position with respect to arbor support 21 (FIGURE 3).

Formed within top wall 13 is a narrow slot-like aperture 30 for alignment with tapped opening 25 or 25', depending upon which may be presented upwardly responsive to the attitude of support 21 to bearing openings 20, 20', for extension therethrough of a set screw 31 threadedly received within the particular aligned tapped opening 25 or 25' to maintain arbor support 21 in selected disposition within chamber 19; said set screw 31 having an enlarged head 32 for frictionally abutting the portions of top wall 13 adjacent aperture 30 for securement of arbor support 21 in its position of adjustment (FIGURE 3). If desired, a washer 32' may be provided between enlarged head 32 of set screw 31 and top wall 13 for enhancing the engagement therebetween.

At its normally outer end shaft or base section 22 of arbor support 21 is turned down, as at 33, to present a relatively reduced end surface 34. Fixed within such outer end of base section 22 is a tubular extension 35 being of relatively less outside diameter than base section 22 but having an inside diameter substantially the same as that of bore 23 for accommodating adjustment rod 29 which is accepted therein; said rod 29 being of a greater length than the overall length of arbor support 21. In usage, the base end of rod 29 projects through bore 23 while the opposite or working end which extends beyond tubular section 35 is tapered to a relatively fine point for entry into the primer cup hole, indicated at H, of a cartridge C to be worked upon by trimmer A. Said tubular extension 35 at its outer end is circumferentially threaded, as at 36, for receiving a lock nut 37; the distance between said lock nut 37 when fully engaged and end surface 34 being substantially coincidental with the length of arbors 16 which later when disposed upon tubular extension 35 are maintained firmly against axial or rotative movement.

Each arbor 16 is provided proximate one of its ends, and that being the one which is presented adjacent end surface 35, with a circumferential cutting groove 38 (FIGURE 5).

Projecting from each side wall 3, 4 laterally of compartment 15, is a boss 39, 39' respectively, which is centrally tapped as at 40 for receiving the externally threaded stem 41 of a mounting bolt 42 having a diametrally enlarged smooth-surfaced neck 43 constituting a shaft on which a cutter supporting arm 44 is swingably mounted. Said arm 44 at its rearward end is provided with an opening 45 for receiving neck 43 of bolt 42. Communicating with said opening on either side thereof is a recess 46, 46', the base of which is defined by an annular shoulder 47, 47' against which bears one end of a compression spring 48 encircling said neck and bearing at its other end against the inner face of an enlarged knurled head 49 of said bolt 42. Said spring 48 thus acts to urge cutter arm 44 toward the outer face of the related boss 39 to produce friction and thereby restrain cutter arm 44 from free swinging action and conduce to controlled operation thereof. Cutter arm 44 is presented for overlying relationship with respect to tubular extension 35 of arbor support 21 and is of such length as to extend forwardly thereof; there being a finger grip 50 provided on the forward extremity of said arm 44.

In its central portion arm 44 is provided with a blade-receiving compartment 51 having a fixed wall portion 52 and a cooperating closure plate 53. Projecting from wall portion 52 is a transversely extending pair of male members 54, 54' for extension through the customary transverse opening in a cutter such as a razor blade r and for reception within a complementary, but continuous female recess 55, on the inner face of closure plate 53; there being aligned apertures as 56 in wall portion 52 and closure plate 53, for receiving a retention screw 57 which likewise projects through the central opening of the cutter blade for securing closure plate 53 firmly in position and rigidly sandwiching the cutter blade r therebetween. The lower edge of arm 44 is partially cut away, as at 58, to permit exposure of the cutting edge of cutter blade r as can best be seen in FIGURE 7. Said cut away portion 58 being less than the length of the cutter blade so that only a portion of the cutting edge is presented.

The operation of cartridge trimmer A is as follows: an arbor 16 having the appropriate diameter for adequate support, is selected and placed upon tubular extension 35 being gripped between lock nut 37 and end surface 34. Set screw 31 having been heretofore loosened, support 21 is moved axially of chamber 18 so as to locate cutting groove 38 of the selected arbor 16 in alignment with cutter blade r. Thereupon set screw 31 is tightened. Set screw 28 is in loosened condition allowing free movement of adjustment rod 29 and a cartridge C to be reformed is placed upon arbor 16 with the tapered end of rod 29 received within the primer cup hole H. Rod 29 is then shifted longitudinally of support 21, as by the application of pressure upon its base, until the region of cartridge C to be cut overlies cutting groove 38. Thereupon set screw 28 is tightened for rigidifying rod 29 in selected position. With the device as thus set, cartridge C is accurately positioned for trimming by cutter blade r which trimming action is effected by a series of downward strokes of said cutter supporting arm 44 with simultaneous turning or rotation of cartridge C about arbor 16 thereupon causing the development of a continuous line of severance resulting in the removal of the usually charred end of the cartridge C and thus presenting same for reloading operation.

If the user desires the cutting operation may be effected from the opposite side of body A by dismounting cutter supporting arm 44 through unthreading of bolt 42 and then remounting the said arm 44 upon the opposite boss as 39' in this instance. Correspondingly arbor support 21 may be reversed by loosening of set screws 28 and 31 to allow complete removal of support member 21 from chamber 18 so that the same may be remounted within same but from the opposite end so that the tubular extension 35 will project from the opposite end of chamber 18, as toward the left hand side of FIGURE 4. Thereupon set screws 28 and 31 may be appropriately manipulated in the manner above described for stabilizing support 21 and rod 29 in selected position with cutter supporting arm 44 operating in the same manner as above described, but from the opposite side of body A.

Thus, body A is accorded unusual bilateral symmetry to allow the user a choice as to the side from which the operation may be effected, thereby conducting to the user's convenience and ease.

It is apparent that the use of trimmer A permits marked economy in cutter blades r in that a single blade may be reversed after the exposed portion has been well used and subsequent thereto the said blade r may then be turned upside down for use of the opposite cutting edge.

The extreme utility of compartment 15 is indeed manifest as it provides a secure depository for arbors 16 maintaining same in protected condition pending usage.

It should be understood that changes and modifications in the formation, construction, arrangement, and combination of the several parts of the cartridge trimmer may be made and substituted for these herein shown and described without departing from the nature and principles of my invention.

Having thus described my invention, what I claim and desire to secure by Letters Patent is:

1. A cartridge trimmer comprising a body, an arbor support, means for shiftably mounting said arbor support on said body, an arbor positionable upon said arbor support, said arbor having a cutting groove, means mounted on said arbor support for presenting a cartridge to be trimmed in operative relationship to said cutting groove, and cutting means receivable within said groove.

2. A cartridge trimmer comprising a body, an elongated arbor support, said body having bearings for supporting said arbor support, means for retaining said arbor support in selected axially shifted relationship to said bearings, an arbor disposable upon said arbor support, said arbor having a cutting groove in its exterior surface, means mounted on said arbor support for presenting a cartridge to be trimmed in selected relationship to said arbor cutting groove, and cutting means receivable within said cutting groove.

3. A cartridge trimmer comprising a body, an elongated arbor support, said body having bearing means for supporting said arbor support, said arbor support having an extension projecting beyond said bearings, an arbor mountable upon said arbor support extension and having a cutting groove in its exterior surface, means for maintaining said arbor support in selected axially shifted relationship to said bearings, means for retaining said arbor upon said arbor support extension against axial and rotative movement, a rod disposed co-axially within said arbor support and being adapted for longitudinal shiftable movement therein, means for retaining said rod in selected relationship to said arbor support, and a cutter presented for reception within said cutting groove.

4. A cartridge trimmer comprising a body, an elongated tubular arbor support, said body having bearings for supporting said arbor support, said arbor support being adapted for axially shiftable movement within said bearings and having a tubular extension for projection beyond said bearings, means for maintaining said arbor support within said bearings against axial and rotative movement, a cartridge supporting arbor mountable upon the tubular extension of said arbor support in surrounding relationship thereto and having an external cutting groove, means for maintaining said arbor against rotative and axial movement, an elongated adjustment rod presented within said arbor support and its extension and having a relatively greater length for extension beyond said tubular extension, said adjustment rod being adapted for axial shiftable movement within said arbor support, means for maintaining said rod in selected position, said rod having a tapered end for reception within the primer cup hole of a cartridge to be trimmed, and a cutter receivable within the arbor cutting groove.

5. A cartridge trimmer as defined in claim 4 and further characterized by said body having an enlarged compartment dimensioned for reception of a plurality of arbors for storing same when not in use, and means within said compartment for maintaining said arbors against inadvertent damaging contact.

6. A cartridge trimmer as defined in claim 3 and further characterized by said cutter comprising an arm swingably mounted on said body, said arm being presented for overlying relationship with respect to said arbor when in mounted position, and a cutting blade removably mounted upon said arm.

7. A cartridge trimmer as defined in claim 6 and further characterized by said cutter arm having a blade receiving compartment, said cutter arm being cut away in its lower edge portion for exposing a part of the cutting edge of said blade for presenting same for reception within said cutting groove.

8. A cartridge trimmer as defined in claim 3 and further characterized by said arbor support being receivably within said bearings from either direction, said cutter comprising a cutter arm swingably mounted on said body for extension above and forwardly of said arbor when in mounted position, said arm carrying a cutting blade, and means for mounting of said cutter arm on opposed sides of said body for co-operation with said arbor depending upon the disposition of said arbor support with respect to said bearings.

No references cited.

RICHARD H. EANES, JR., *Primary Examiner.*